United States Patent [19]

Takahashi et al.

[11] Patent Number: 4,967,727

[45] Date of Patent: Nov. 6, 1990

[54] FUEL CONTROLLER FOR AN INTERNAL COMBUSTION ENGINE

[75] Inventors: Toshihisa Takahashi; Masanobu Uchinami, both of Himeji City, Japan

[73] Assignee: Mitsubishi Denki Kabushiki Kaisha, Tokyo, Japan

[21] Appl. No.: 394,685

[22] Filed: Aug. 16, 1989

[30] Foreign Application Priority Data

Aug. 17, 1988 [JP] Japan ............................. 63-204405

[51] Int. Cl.$^5$ ............................................. F02D 7/00
[52] U.S. Cl. ............................... 123/481; 123/198 F; 123/436
[58] Field of Search ............... 123/481, 479, 425, 480, 123/198 DB, 198 F, 436

[56] References Cited

U.S. PATENT DOCUMENTS

| | | | |
|---|---|---|---|
| 4,144,863 | 3/1979 | Abdoo | 123/198 F |
| 4,165,610 | 8/1979 | Iizuka et al. | 123/481 |
| 4,366,794 | 1/1983 | Hachiga et al. | 123/479 |
| 4,499,876 | 2/1985 | Yamamato | 123/198 F |
| 4,550,704 | 11/1985 | Barbo et al. | 123/481 |
| 4,768,494 | 9/1988 | Hale | 123/579 X |

Primary Examiner—Raymond A. Nelli
Attorney, Agent, or Firm—Sughrue, Mion, Zinn, Macpeak & Seas

[57] ABSTRACT

A fuel controller for an internal combustion engine has a microprocessor which calculates the air intake rate per cylinder per suction stroke of the engine. The microprocessor detects misfiring when the air intake rate undergoes a large increase, due to a fall in enginie rotational speed caused by misfiring. The microprocessor prevents the fuel injector of a misfiring cylinder from supplying fuel to the misfiring cylinder.

6 Claims, 6 Drawing Sheets

FUEL CONTROLLER FOR AN INTERNAL COMBUSTION ENGINE

BACKGROUND OF THE INVENTION

This invention relates to a fuel controller for an internal combustion engine. More particularly, it relates to a fuel controller which can stop the supply of fuel to an individual cylinder which is misfiring.

Electronic fuel injection systems are becoming increasingly common in internal combustion engines for automobiles. In these systems, an optimal air-fuel ratio is calculated on the basis of various operating parameters such as the engine speed, the air intake rate, the air intake temperature, and the engine temperature. Electromagnetically-operated fuel injectors are then controlled so as to achieve an air-fuel mixture having the optimal air-fuel ratio.

Many cars are equipped with a catalytic converter for removing harmful components from the engine exhaust gases. A typical catalytic converter is a three-way catalytic converter which simultaneously oxidizes carbon monoxide and hydrocarbons while it reduces oxides of nitrogen (NOx). An electronic fuel injection system is usually designed to maintain the air-fuel ratio near the stoichiometric ratio so that the catalytic converter can function effectively.

Occasionally, due to breakage of parts, poor electrical connections, or equipment malfunctions, combustion does not take place properly in the cylinders of an engine and so-called "misfiring" occurs. Due to misfiring, a mixture of uncombusted fuel and air flows into the catalytic converter, and a sudden chemical reaction takes place, causing an enormous increase in the temperature of the catalytic converter. Under these conditions, the catalytic converter can not function properly, and harmful exhaust gases are discharged into the atmosphere. The increase in temperature also produces degradation of the catalytic converter and shortens its life span. Furthermore, when the automobile is stationary, if dead grass or other combustible material should contact the catalytic converter when it is at an abnormally high temperature due to misfiring, there is the possibility of a fire starting.

SUMMARY OF THE INVENTION

Accordingly, it is an object of the present invention to provide a fuel controller for an internal combustion engine which can detect misfiring of a cylinder of the engine and stop the supply of fuel to the misfiring cylinder while allowing the engine to continue running on the cylinders which are functioning normally.

When a cylinder of an engine misfires, the rotational speed of the engine suddenly falls. If the air intake rate into the engine is substantially constant at the time of misfiring, due to the fall in the engine rotational speed, the amount of intake air per engine cycle for the misfiring cylinder will sharply rise. Therefore, misfiring can be detected by comparing changes in the amount of intake air per cylinder per suction stroke with a prescribed value.

A fuel controller in accordance with the present invention comprises means for measuring the amount of intake air per cylinder per a prescribed number of suction strokes of the engine, means for sensing a misfiring cylinder based on changes in the measured air intake, and means for cutting off the supply of fuel to a misfiring cylinder.

In a preferred embodiment, the means for measuring the air intake comprises an air flow sensor which generates signals corresponding to the air flow rate into the engine, a crank angle sensor which generates a crank angle signal at prescribed crankshaft angles, and a microprocessor responsive to the air flow sensor and the crank angle sensor. Based on the air flow rate measured by the air flow sensor and the engine rotational speed indicated by the output of the crank angle sensor, the microprocessor calculates the air intake Q/N per cylinder per a prescribed number of suction strokes.

In a preferred embodiment, the means for sensing a misfiring cylinder comprises a microprocessor which calculates the difference $\Delta$/N in the air intake Q/N between successive power strokes of the engine. The microprocessor determines that a cylinder is misfiring when two of the differences $\Delta Q/N$ differ from one another by more than a prescribed amount or by more than a prescribed percent.

Various means can be used for preventing the fuel injector of a misfiring cylinder from supplying fuel. In a preferred embodiment, a fuel injector is prevented from supplying fuel to a misfiring cylinder by controlling a counter which determines the drive time of the fuel injector.

DESCRIPTION OF THE PREFERRED EMBODIMENTS

Figure 1:
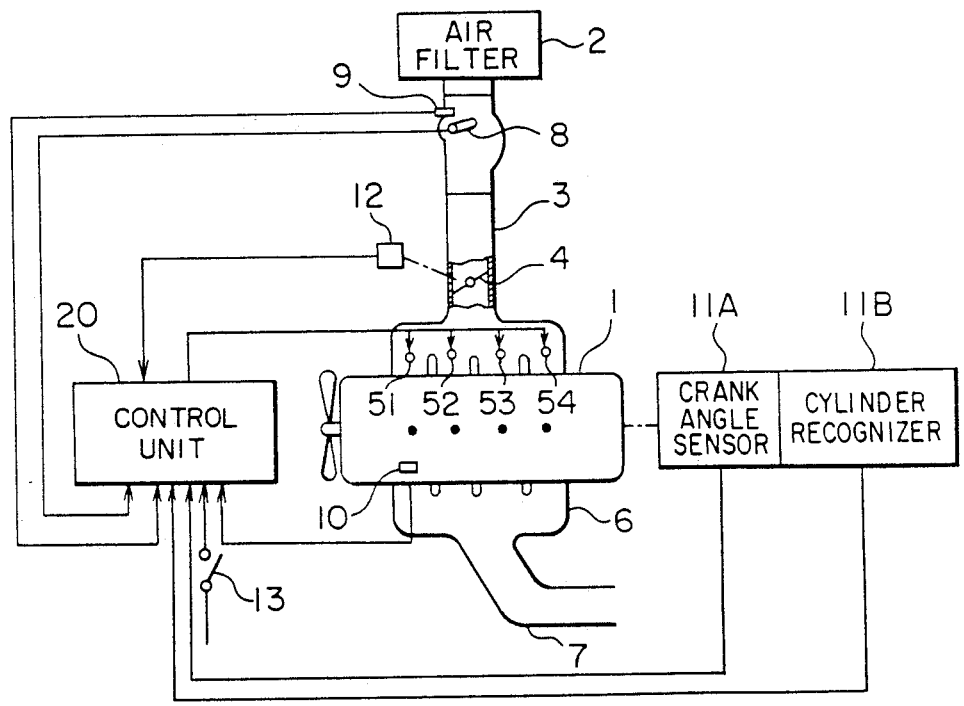
FIG. 1 is a schematic illustration of a fuel controller in accordance with the present invention as applied to a four-cylinder engine.

A preferred embodiment of a fuel controller in accordance with the present invention will now be described while referring to the accompanying drawings. FIG. 1 is a schematic illustration of a fuel controller of the present invention as applied to a four-cycle spark ignition automobile engine 1. The illustrated engine 1 is equipped with four cylinders, but the number of cylinders is not critical and the present invention can be applied to an engine having any number of cylinders.

As shown in FIG. 1, the engine 1 has an air intake pipe 3 which is connected to the four cylinders. An air filter 2 is mounted on the entrance of the air intake pipe 3, and a throttle valve 4 is rotatably mounted inside the air intake pipe 3. Four electromagnetically-operated fuel injectors 51–54 are installed on the engine 1, each of the injectors being associated with one of the four cylinders. The fuel injectors are driven by a control unit 20. Exhaust gas is discharged from the engine 1 via an exhaust manifold 6 and an exhaust pipe 7.

An air flow sensor 8 which senses the rate of air intake into the engine is mounted in the air intake pipe 3. It generates an analog voltage corresponding to the air intake rate and inputs the voltage to the control unit 20.

A thermistor-type air temperature sensor 9 which senses the temperature of the intake air is also mounted on the air intake pipe 3. It generates an analog voltage corresponding to the intake air temperature and provides the voltage to the control unit 20.

A thermistor-type water temperature sensor 10 is mounted on the engine 1. It senses the cooling water temperature and generates a corresponding analog voltage which it supplies to the control unit 20. A crank angle sensor 11A generates output pulses at prescribed crankshaft angles of the engine and supplies the pulses to the control unit 20. In a four-cylinder engine, the crank angle sensor 11A typically generates an output pulse for every 180 degrees of crankshaft rotation. A cylinder recognition sensor 11B generates a cylinder recognition signal corresponding to a prescribed cylinder of the engine. The rising edge of the cylinder recognition signal immediately precedes the rising edge of one of the output pulses from the crank angle sensor 11A.

An idle switch 12 which senses when the opening of the throttle valve 4 is less than a prescribed amount is installed on the throttle valve 4. It generates an output signal which is provided to the control unit 20.

Based on the output signals from the air flow sensor 8, the intake air temperature sensor 9, the water temperature sensor 10, the crank angle sensor 11A, the cylinder recognition sensor 11B, and the idle switch 12, the control unit 20 calculates the appropriate amount of fuel to be supplied to the engine 1 and controls the operation of the fuel injectors 51-54 so as to supply this amount. Furthermore, it detects when one of the cylinders misfires and cuts off the supply of fuel to the misfiring cylinder.

The engine is also equipped with an unillustrated ignition system including an ignition coil and spark plugs.

Figure 2:
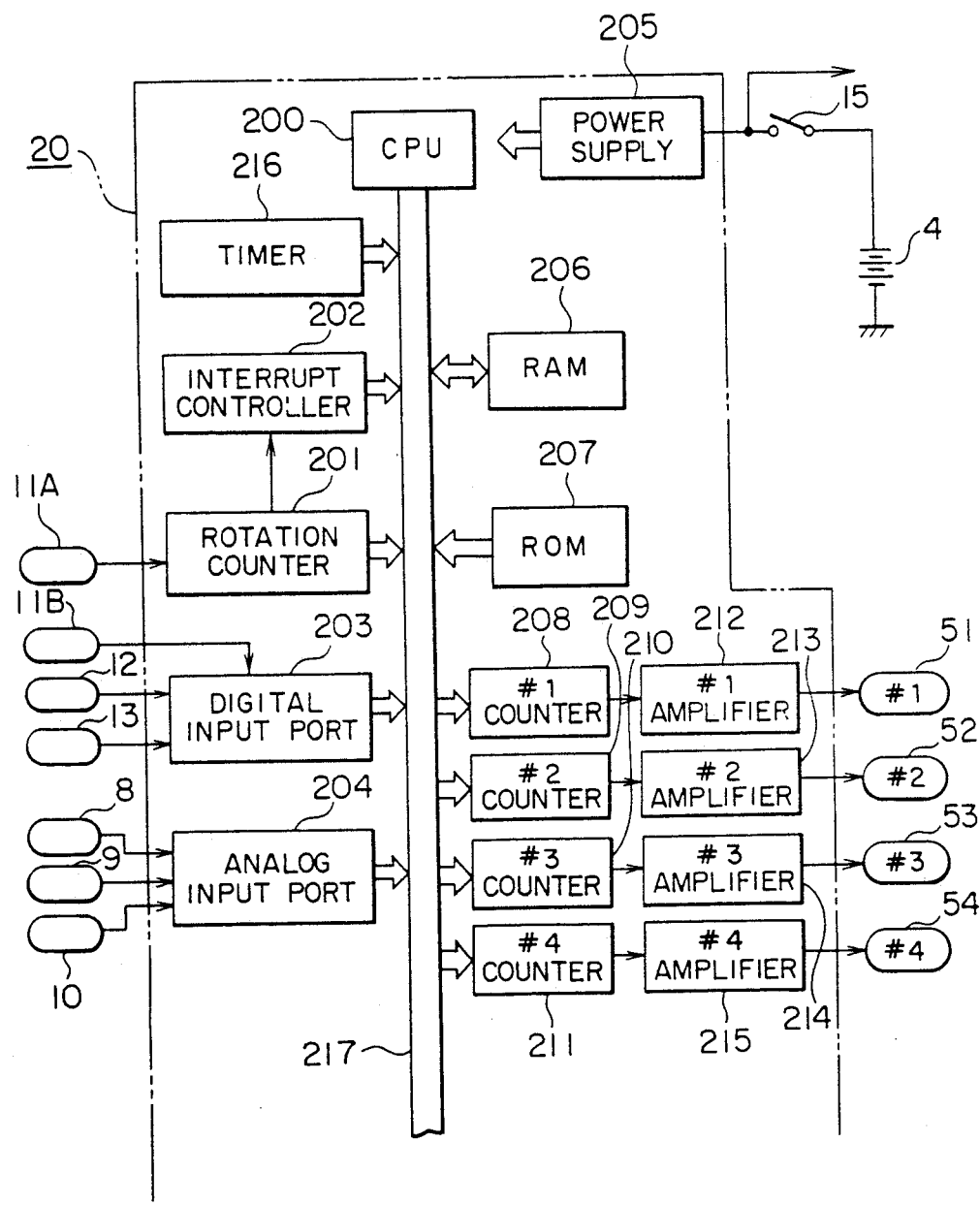
FIG. 2 is a block diagram of the control unit of FIG. 1.

FIG. 2 is a block diagram of the control unit 20 of FIG. 1. The operation of the control unit 20 is controlled by a microprocessor, which will be referred to as a CPU 200. A rotation counter 201 which is connected to the crank angle sensor 11A generates an output signal corresponding to the period between successive output pulses of the crank angle sensor 11A. It also sends an interrupt signal to an interrupt controller 202 in synchrony with the engine rotations. Upon receiving the interrupt signal, the interrupt controller 202 provides an interrupt signal to the CPU 200 via a bus 217. In response to the interrupt signal, the CPU 200 executes an interrupt handling routine and calculates the amount of fuel to be supplied to the engine 1.

A digital input port 203 transmits digital signals to the CPU 200, such as signals from the cylinder recognition sensor 11B and the idle switch 12 and a starter signal from the starter switch 13 which turns an unillustrated starter on and off.

An analog input port 204 includes an analog multiplexer and an A/D converter. The A/D converter performs A/D conversion of signals from the air flow sensor 8, the air temperature sensor 9, and the cooling water temperature sensor 10 and provides the resulting digital signals to the CPU 200 in sequence.

The output signals from the rotation counter 201, the interrupt controller 202, the digital input port 203, and the analog input port 204 are transmitted to the CPU 200 via the bus 217.

A battery 14 supplies power to the CPU 200 via a key switch 15 and a power supply circuit 205.

A RAM 206 and a ROM 207 are connected to the CPU 200 by the bus 217. The RAM is used for temporary data storage, and the ROM 207 stores various constants and programs to be executed by the CPU 200.

The duration of fuel injection by the fuel injectors 51-54 is controlled by counters 208-211 in the form of down counters equipped with registers. Each counter receives a signal from the CPU 200 indicating the amount of fuel to be injected and converts the signal into a pulse having a width which determines the duration of fuel injection for one of the fuel injectors.

The output signals of the counters 208-211 are respectively provided to four power amplifiers 212-215 which serve as drivers for the fuel injectors. The amplifiers 212-215 are connected to the fuel injectors 51-54, respectively.

A timer 216 generates a signal when a prescribed length of time has elapsed and provides the signal to the CPU 200.

Figure 3:
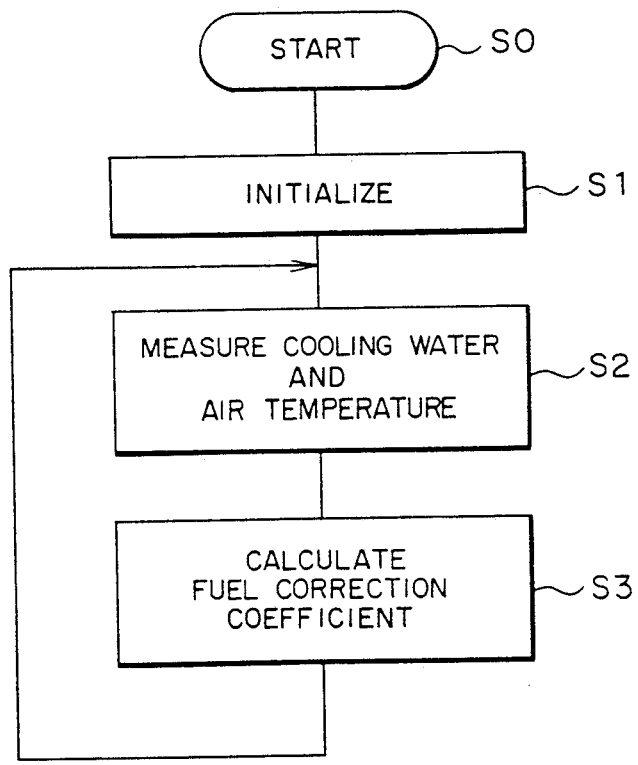
FIG. 3 is a flow chart of the main routine executed by the CPU of FIG. 2.

FIG. 3 is a flow chart of the main program executed by the CPU 200. The operation of the control unit of FIG. 2 will now be described based on this flow chart.

If the key switch 15 and the starter switch 13 are turned on to start the engine 1, in Step S0, the CPU 200 begins processing. In Step S1, initialization takes places. In Step S2, digital values corresponding to the cooling water temperature and the intake air temperature are read into the CPU 200 from the analog input port 204. In Step S3, a fuel injection correction coefficient K is calculated based on the measured temperatures and the result is stored in the RAM 206. At the completion of Step S3, the program returns to Step S2. The CPU 200 normally repeats Steps S2 and S3 in accordance with a control program.

Figure 4:
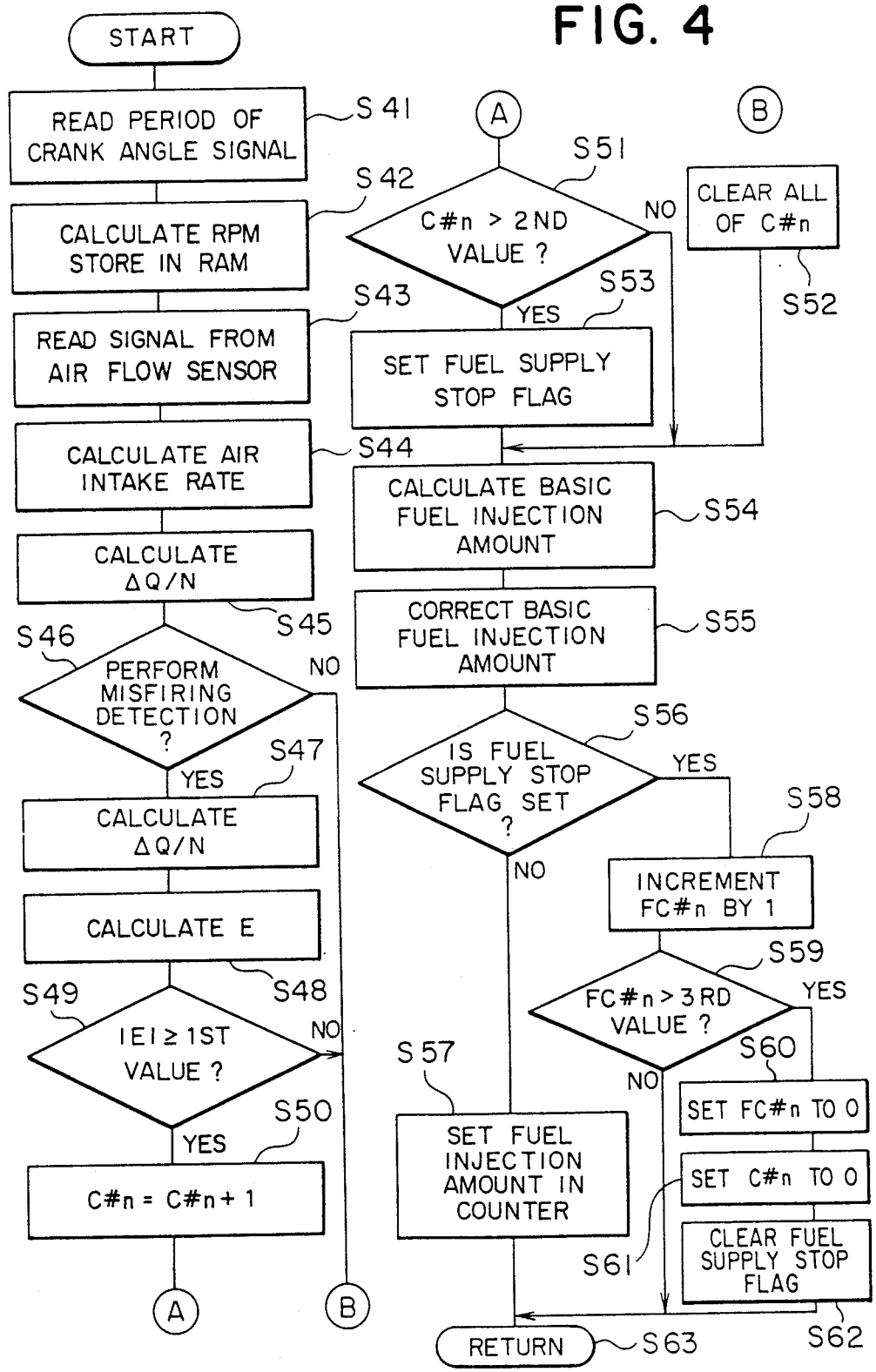
FIG. 4 is a flow chart of an interrupt handling routine executed by the CPU of FIG. 2.

When an interrupt signal is input from the interrupt controller 202, the CPU 200 immediately interrupts its processing, even if it is in the middle of the main routine, and transfers to an interrupt handling routine, a flow chart of which is illustrated in FIG. 4.

First, in Step S41, a signal which indicates the period between successive output pulses of the crank angle sensor 11A is input from the rotation counter 201, and in Step S42 the CPU calculates the engine rotational speed Ne using the formula Rotational Speed = X/Period between Pulses wherein X is a constant. The calculated rotational speed Ne is then stored in the RAM 206.

In Step S43, the output signal of the air flow sensor 8 is read in through the analog input port 204. Based on this signal, the air intake rate Q is calculated.

In Step S45, based on the air intake rate Q calculated in Step S44 and the engine rotational speed Ne calculated in Step S42, the amount of intake air per suction stroke per cylinder Q/N (herebelow referred to as the unit air intake) is calculated and stored in the RAM 206. If the units of the air intake rate Q are liter/sec and the engine rotational speed Ne is measured in rpm, then N=Ne/30.

In Step S46, it is determined whether the engine operating state is such that misfiring detection should be performed. One suitable operating state is an idle state which can be determined based on the engine rotational speed Ne, the output of the idle switch 12, the output of an unillustrated speedometer, or the output of an unillustrated neutral switch. Another suitable operating state is one in which the air intake rate Q, which is determined by the throttle valve opening, is constant or nearly constant. This occurs, for example, when the flow rate of air through the throttle is choked at the speed of sound. Therefore, if the output signal from the throttle valve opening sensor 12 is constant or nearly constant, it can be determined that the air intake rate Q is also constant or nearly constant.

If it is determined in Step S46 that the engine operating state is suitable for detecting misfiring, the routine proceeds to Step S47, and when it is determined that the operating state is not suitable, the routine proceeds to Step S52.

In Step S47, the difference $\Delta Q/N$ between the unit air intake $Q/N$ which was just calculated and the unit air intake $Q/N$ which was calculated for the previous cylinder is calculated and is stored in the RAM 206. Based on the difference $\Delta Q/N$, the CPU 200 detects if misfiring is taking place. The manner in which the CPU 200 detects misfiring will be explained while referring to FIG. 5, which is a timing diagram.

Figure 5:
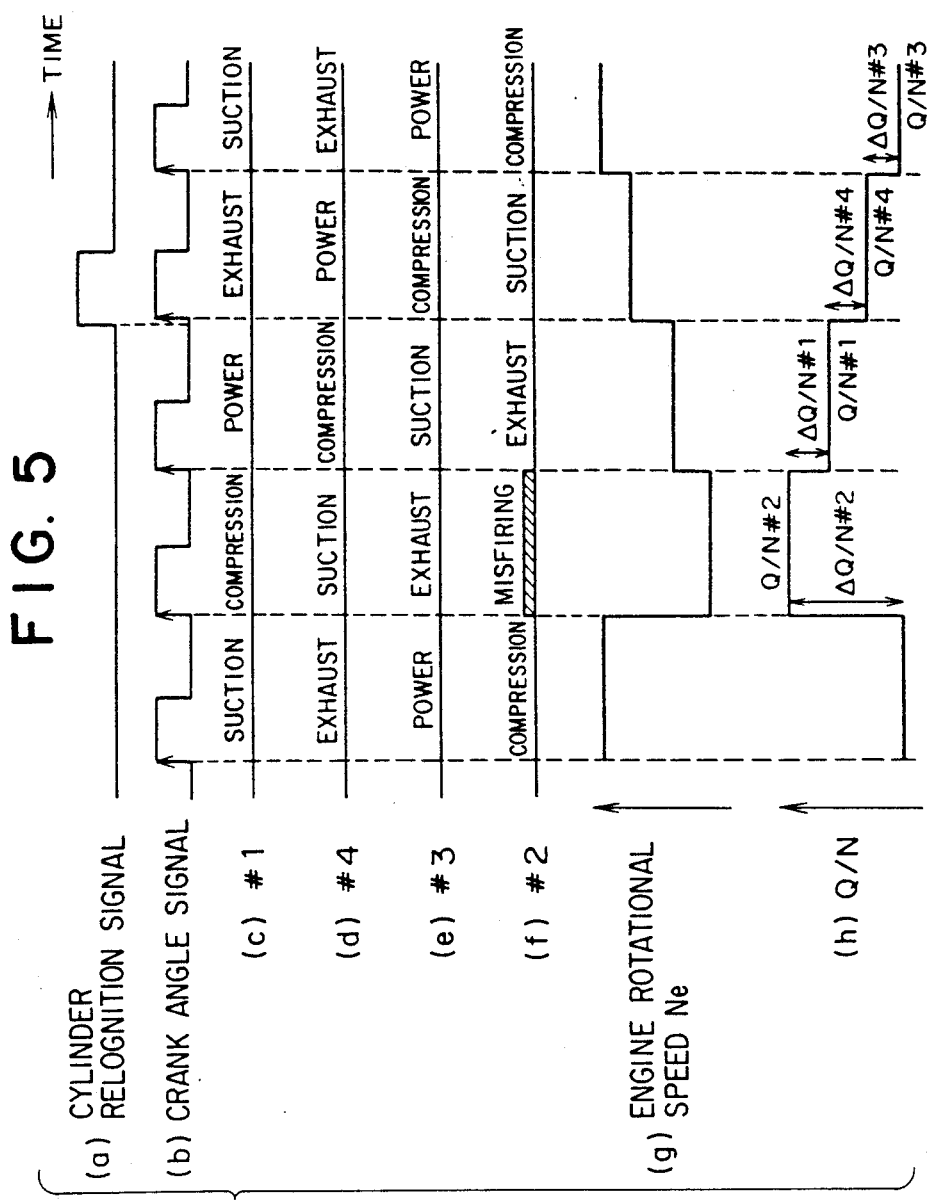
FIG. 5 is a timing diagram showing the rotational speed and the unit air intake of an engine when one of the cylinders is misfiring.

In FIG. 5, (a) shows the output of the cylinder recognition sensor 11B. (b) shows the output of the crank angle sensor 11A. (c)-(f) show the states in each of the four cylinders. (g) shows the calculated rotational speed Ne of the engine. (h) shows the unit air intake $Q/N$ for each cylinder when the engine is idling and cylinder #2 is misfiring.

When misfiring occurs, the engine 1 does not generate any torque, so the rotational speed drops, and the unit air intake $Q/N$ increases. The unit air intake $Q/N$ during the power stroke of cylinder #m will be expressed as $Q/N\#m$, and the difference between $Q/N\#m$ and $Q/N$ for the previous cylinder to fire will be expressed as $\Delta Q/N\#m$. For example, $\Delta Q/N\#1 = Q/N\#1 - Q/N\#2$. The cylinder which is in its power stroke is the cylinder which will be supplied fuel in the next stroke of the engine. As it is known which cylinder is presently being supplied fuel, the cylinder which is in its power stroke can be easily determined.

In Step S47, the change $\Delta Q/N\#m$ in the unit air intake $Q/N$ is calculated. In step S48, the difference E between the value of $\Delta Q/N$ which was calculated for the power stroke of cylinder #m cylinder and the value of $\Delta Q/N$ which was calculated for the preceding cylinder to fire, the cylinder before that, and the cylinder before that is determined.

For example, at the point in time in FIG. 5 that $\Delta Q/N\#3$ is calculated for the firing stroke of the third cylinder, E has the following values:

$E_{43} = \Delta Q/N\#4 - \Delta Q/N\#3$ $E_{13} = \Delta Q/N\#1 - \Delta Q/N\#3$ $E_{23} = \Delta Q/N\#2 - \Delta Q/N\#3$ In Step S49, the absolute value of each E computed in Step S48 is compared with a first prescribed value to determine if a cylinder is misfiring. If one of the absolute values $|E|$ is greater than or equal to the first prescribed value, then it is determined that misfiring is taking place.

For example, at the point in time in FIG. 5 at which $\Delta Q/N\#2$ is calculated, $|E_{12}|$, $|E_{32}|$, and $|E_{42}|$ are also calculated. All three of $|E_{12}|$, $|E_{32}|$, and $|E_{42}|$ are greater than the first prescribed value, so it is determined that cylinder #2 is misfiring. As another example, at the point in time at which $\Delta Q/N\#1$ is calculated, $|E_{21}|$, $|E_{31}|$, and $|E_{41}|$ are also calculated. $|E_{21}|$ is greater than the first prescribed value, while $|E_{31}|$ and $|E_{41}|$ are both zero and therefore less than the first prescribed value. In this case as well, it can be determined that cylinder #2 is misfiring based on the values of E.

If misfiring is detected in Step S49, then the routine proceeds to Step S50, and if misfiring was not detected, then the routine proceeds to Step S52. In Step S50, 1 is added to a misfiring counter C#n corresponding to the cylinder #n in which misfiring was sensed. C#n indicates the number of times that misfiring of cylinder #n has been detected. In Step S51, it is determined whether the misfiring counter C#n is larger than a second predetermined value. If C#n is larger than the second predetermined value, then the routine proceeds to Step S53, and if not it proceeds to Step S54.

In Step S53, a fuel supply cut-off flag for misfiring cylinder #n which has been continuously misfiring is set, and then the routine proceeds to Step S54.

In Step S46, if it is determined that the engine operating state is not suitable for misfiring detection, or if in Step S49 misfiring was not detected, then in Step S52, misfiring counter C#n is set equal to zero, and then the routine proceeds to Step S54.

In Step S54, based on the unit air intake $Q/N$ this time which was found in Step S45, a basic fuel injection amount is calculated. In Step S55, based on the basic fuel injection amount found in Step S54 and the fuel correction coefficient K determined in Step S3, the actual fuel injection amount is calculated. In Step S56, it is checked whether the fuel supply cut-off flag for the cylinder to which fuel should be injected is set. If the flag is not set, then the routine proceeds to Step S57, and if the flag is set, then the routine proceeds to Step S58.

In Step S57, the fuel injection amount which was calculated in Step S55 is set in one of the counters 208-211 corresponding to the cylinder into which fuel is to be injected. After the fuel injection amount is set in the counter, in Step S63, the main routine is returned to. After the counter is set, it counts downwards from the set value, and the corresponding one of power amplifiers 212-215 drives one of the fuel injectors while the counter is counting down, thereby injecting fuel into the appropriate cylinder.

On the other hand, if it is determined in Step S56 that the fuel supply cut-off flag is set, then in Step S58, 1 is added to a fuel supply cut-off counter FC#n corresponding to cylinder #n in which misfiring was detected. In Step S59, it is determined whether the fuel supply cut-off counter FC#n exceeds a third prescribed value. If it does not exceed it, then the routine proceeds to Step S63 and the main routine is returned to. If the third prescribed value is exceeded, then the routine proceeds to Step S60. In Step S60, the fuel supply cut-off counter FC#n is set equal to zero and a value of zero is set in the RAM 206. In Step S61, the misfiring counter C#n is set to zero and a value of zero is set in the RAM 206. In Step S62, the fuel supply cut-off flag for the cylinder #n is reset, and in Step S63, the main routine is returned to.

Figure 6:
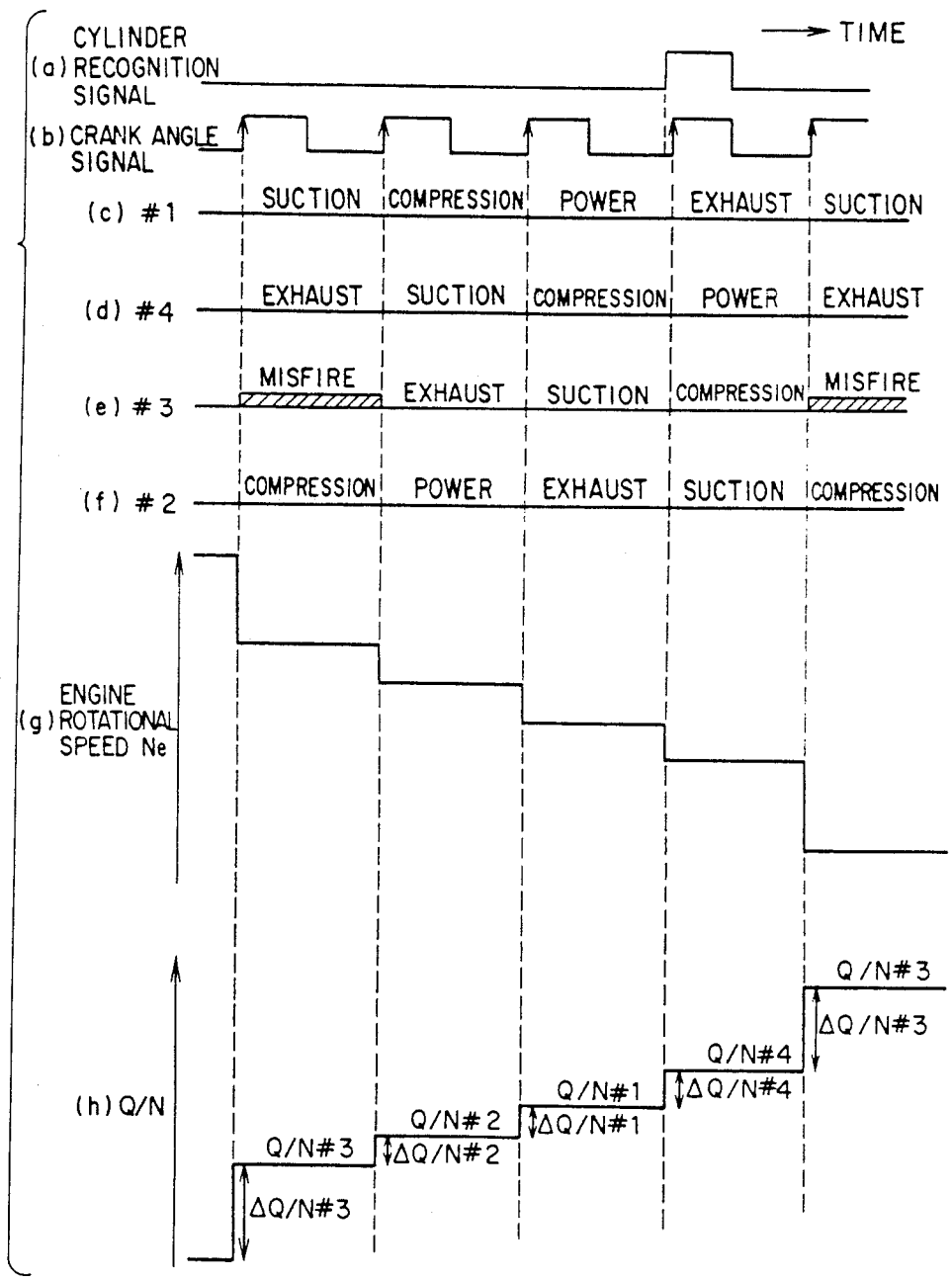
FIG. 6 is a timing diagram similar to FIG. 5 illustrating the rotational speed and the unit air intake when the engine is decelerating and one of the cylinders is misfiring.

FIG. 6 is a timing diagram similar to FIG. 5, showing the case in which cylinder #3 is misfiring at a time when the engine rotational speed is decreasing with the throttle value fully closed. Due to engine deceleration, Q/N increases for each stroke of the engine. However, the fall in the engine rotational speed Ne due to misfiring is much larger than the fall in the engine rotational speed due to engine deceleration. Therefore, if the air intake rate Q is constant, the change in the unit air intake $\Delta$/N#3 due to misfiring will be much larger than the changes in the unit air intake $\Delta$Q/N#1, $\Delta$Q/N#2, and $\Delta$Q/N#4 due only to engine deceleration. Accordingly, the result of Step S49 of FIG. 4 will be the same as when the engine is idling, and the CPU 200 can detect the misfiring of cylinder #3 in the manner shown in FIG. 4.

In the above-described embodiment, the misfiring counter C#n is incremented each time a misfiring cylinder is detected. However, if the misfiring counter C#n is incremented only when all of the absolute values $|E|$ are larger than the first prescribed value, the number of misfirings can be counted. In this case, when only one of the absolute values $|E|$ is larger than the first prescribed value, the routine can jump from Step S49 to Step S54.

In the above-described embodiment, in Step S47 of FIG. 4, misfiring is determined by calculating the change $\Delta$/N in the unit air intake Q/N. However, instead of using the absolute change $\Delta$Q/N, misfiring can be detected based on the percent change =(present Q/N−previous Q/N) / present Q/N and the same effects as for the above-described embodiment can be obtained. For example, if the unit air intake which was calculated for cylinder #m is Q/N#m, and if the unit air intake for cylinder #k, which fired just before cylinder #m, is Q/N#k, then the percent change P#m in the unit air intake for the two cylinders is given by P#m=(Q/N#m−Q/N#k) / (Q/N#m)

If the most recently calculated value of the percent change is P#m′, and if the percent change which was calculated for the previous cylinders is given by P#m, then E is expressed as $E_{mm'}$=P#m−P#m′.

$|E|$ can then be compared with a first prescribed value to determine if a cylinder is misfiring, just as in the above-described embodiment.

Furthermore, misfiring detection can be performed based on both the absolute change and the percent change in the unit air intake Q/N.

In accordance with the present invention, when it is determined that a cylinder has misfired, the fuel injector for that cylinder is prevented from supplying fuel, while fuel continues to be supplied to the other cylinders. Therefore, the vehicle can continue to operate on the remaining cylinders. As no fuel is supplied to the cylinder which misfired, uncombusted fuel can not reach the catalytic converter. As a result, the catalytic converter is prevented from overheating, so it is not degraded, harmful gases are not discharged from the catalytic converter, and there is no danger of fires being started by contact with the catalytic converter.

What is claimed is:

1. A fuel controller for an internal combustion engine having a plurality of cylinders and a plurality of fuel injectors which supply fuel to the cylinders, comprising:
   measuring means for measuring the amount of intake air Q/N per cylinder per a prescribed number of suction strokes of the engine;
   misfiring sensing means for sensing a misfiring cylinder based on changes in the amount of intake air Q/N measured by said measuring means; and
   fuel supply cut-off means for cutting off the supply of fuel to a misfiring cylinder which is sensed by said misfiring sensing means.

2. A fuel controller as claimed in claim 1, wherein said measuring means comprises:
   air flow sensing means for generating a signal corresponding to the air flow rate Q into the engine;
   crank angle sensing means for generating an output signal at prescribed rotational angles of the engine; and
   calculating means responsive to said air flow sensing means and said crank angle sensing means for calculating the air intake Q/N per cylinder per a prescribed number of suction strokes of the engine.

3. A fuel controller as claimed in claim 1, wherein said misfiring sensing means comprises:
   means for calculating the change $\Delta$Q/N in the air intake Q/N between successive power strokes of the engine for each cylinder; and
   means for determining when the absolute value E of the difference E between $\Delta$Q/N for two of the cylinders is greater than a prescribed amount.

4. A fuel controller as claimed in claim 1, wherein said misfiring sensing means comprises:
   means for calculating the change $\Delta$Q/N in the air intake Q/N between successive power strokes of the engine for each cylinder; and
   means for determining when the absolute value E of the difference E between $\Delta$Q/N for two of the cylinders is greater than a prescribed percent.

5. A method for controlling the fuel supply to an internal combustion engine having a plurality of cylinders and a fuel injector associated with each cylinder, comprising:
   measuring the amount of intake air Q/N per cylinder per suction stroke of the engine;
   detecting a misfiring cylinder based on the change $\Delta$Q/N between measurements; and
   cutting off the supply of fuel to a misfiring cylinder.

6. A method as claimed in claim 5, wherein the step of detecting a misfiring cylinder comprises:
   determining the change $\Delta$Q/N between measurements Q/N corresponding to consecutive power strokes of the engine;
   determining the difference E between a plurality of the changes $\Delta$Q/N;
   comparing the absolute value E of the difference E with a prescribed value; and
   determining that a cylinder has misfired if the absolute value $|E|$ is larger than the prescribed value.

* * * * *